(12) United States Patent
Jayaraman

(10) Patent No.: US 7,211,638 B2
(45) Date of Patent: May 1, 2007

(54) SILICONE-BASED CYANATE-ESTER CROSS-LINKABLE DIE ATTACH ADHESIVE

(75) Inventor: Saikumar Jayaraman, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 310 days.

(21) Appl. No.: 10/607,426

(22) Filed: Jun. 25, 2003

(65) Prior Publication Data

US 2005/0014920 A1 Jan. 20, 2005

(51) Int. Cl.
*C08G 77/06* (2006.01)
*C08G 77/26* (2006.01)

(52) U.S. Cl. .......................................... 528/25; 528/31

(58) Field of Classification Search ................... 528/25, 528/31
See application file for complete search history.

(56) References Cited

U.S. PATENT DOCUMENTS 5,260,398 A * 11/1993 Liao et al. .................... 528/15
5,326,893 A * 7/1994 Liao et al. .................... 556/414
6,136,251 A * 10/2000 Etzbach et al. ........... 264/297.8

OTHER PUBLICATIONS

English language abstract for JP 9–194594 A.*
English language abstract for JP 11–029639 A.*

* cited by examiner

*Primary Examiner*—Marc S. Zimmer
(74) *Attorney, Agent, or Firm*—George Chen

(57) ABSTRACT

The present invention describes a method including: providing a material A, the material A including a siloxane backbone with a hydride functional group; reacting the material A with a material B in the presence of a catalyst to form a material C, the material B including an alkenyl functional group and an aromatic carbonate functional group; heating the material C to form a material D, the material D including a phenol functional group; and reacting the material D with a material E and a material F to form a material G, the material E including a cyanogen halide, the material F including an acid acceptor, the material G including an aromatic cyanate ester functional group.

The present invention further describes a die attach adhesive including a three-dimensional network of substituted triazine rings.

13 Claims, 2 Drawing Sheets

SILICONE-BASED CYANATE-ESTER CROSS-LINKABLE DIE ATTACH ADHESIVE

BACKGROUND OF THE INVENTION

1. Field of the Invention

The present invention relates to the field of semiconductor integrated circuit manufacturing, and more specifically, to a die attach adhesive and a method of forming such an adhesive.

2. Discussion of Related Art

As the density for non-CPU chips continues to increase, the thickness of the package for the chips must be reduced to accommodate the stacking of multiple die on a single substrate form. Consequently, the bondline thickness (BLT), or thickness of the adhesive between the chip and the substrate, must also be decreased. However, the die attach material must continue to serve as a buffer layer between the chip and the substrate to relieve any stress from mismatch in the coefficient of thermal expansion (CTE) which would otherwise cause warpage, cracking, or delamination of the chip.

The latest trends in packaging also involve the elimination of Lead from solder and the raising of the reflow temperature to 260 degrees Centigrade. As a result, the die attach material must be stable at the higher temperatures and be resistant to high humidity while maintaining good adhesion between the chip and the substrate.

Thus, what is needed is a die attach adhesive and a method of forming such an adhesive.

DETAILED DESCRIPTION OF THE PRESENT INVENTION

In the following description, numerous details, such as specific materials, dimensions, and processes, are set forth in order to provide a thorough understanding of the present invention. However, one skilled in the art will realize that the invention may be practiced without these particular details. In other instances, well-known semiconductor equipment and processes have not been described in particular detail so as to avoid obscuring the present invention.

The present invention describes various embodiments of a method of forming a cyanate-ester-based silicone adhesive, a composition of cyanate-ester-based silicone adhesive, a method of die attach with cyanate-ester-based silicone adhesive, and a die-substrate package with substituted-triazine-ring silicone adhesive having reduced bond line thickness (BLT).

A polymer is a macromolecule that is formed from many small and simple repeating units, or mers. A polymer may be monodisperse or polydisperse. Dispersion refers to the distribution of molecular weights (MW) which is related to the degree of polymerization (DP). A compound that includes Si—O—Si linkage is called a siloxane. A polymer of siloxane is called a polysiloxane.

A polymer may include one or more chains. The principal or main chain, usually the longest, of the polymer is called the backbone. Other secondary chains, usually shorter, that may be attached to the backbone by a covalent bond may be considered as branches of the principal chain. A covalent bond is a directional bond joining atoms. A polymer with only one chain has a linear backbone while a polymer with more than one chain has a branched backbone. A linear backbone may have a zig-zag shape due to the bond angles.

A chain may include one or more types of functional groups. Like branches, functional groups are attached to a chain by a covalent bond, but, unlike branches, functional groups may be short and may repeat along the chain. A functional group that is attached to a chain in a terminal position is considered an end group while a functional group that is attached to a chain in a non-terminal position is considered a pendant group.

The functional group may be small or large. The functional group may be compact or bulky. The functional group may include a lyophilic alkyl group. An organic-substituted polysiloxane is called a polyorganosiloxane (POS). Polyorganosiloxanes have also been widely referred to as silicones ever since F. S. Kipping incorrectly chose this name in the 1920s.

Figure 1:
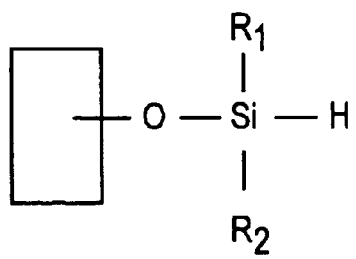
FIG. 1 is an illustration of a polysiloxane with hydride functional group according to the present invention.

Material A is a polyorganosiloxane, or silicone, with hydride functional groups. In an embodiment of the present invention, material A, as shown in FIG. 1, includes a linear siloxane backbone with hydride functional groups. In another embodiment of the present invention, material A is a dimethylsiloxane (DMS) homopolymer with hydride end groups, in which both $R_1$ and $R_2$ pendant groups are methyl groups, $CH_3$. A homopolymer is a polymer that includes only one type of repeating unit, or mer.

A first example of a DMS homopolymer is DMS-H03 with an average molecular weight of about 400–500 and a viscosity of about 2–3 Centipoise (Cps). A second example is DMS-H25 with an average molecular weight of about 17,200 and a viscosity of about 500 Cps. A third example is DMS-H41 with an average molecular weight of about 62,700 and a viscosity of about 10,000 Cps.

Viscosity is a measure of the resistance to flow of a polymer in a solution or in a melt. Viscosity of the polymer varies as a function of size and shape (conformation) of the polymer. Viscosity of the polymer also varies as a function of temperature.

In still another embodiment of the present invention, material A includes a branched siloxane backbone with hydride functional groups, such as a methylhydride-dimethylsiloxane (MH-DMS) alternating copolymer with hydride end groups, in which $R_1$ pendant group is a methyl group, $CH_3$, while $R_1$ pendant group alternates between a methyl group, $CH_3$, and a hydride group, H.

A copolymer is a polymer that includes two or more types of repeating units, or mers. A copolymer of polymer $M_1$ and polymer $M_2$ may include an alternating copolymer, $(M_1M_2)_n$, a random (or statistical) copolymer, a block copolymer, $(M_1)_n(M_2)_n$, and a graft copolymer, such as $(M_1M_1(M_2)_nM_1)_n$.

A first example of an MH-DMS alternating copolymer is HMS-013 with an average molecular weight of about 55,000 and a viscosity of about 6,000–8,000 Cps. A second example is HMS-071 with an average molecular weight of about 1,900–2,000 and a viscosity of about 25–35 Cps. A third example is HMS-501 with an average molecular weight of about 900–1,200 and a viscosity of about 10–15 Cps.

In a further embodiment of the present invention, material A includes a cyclic siloxane backbone with hydride functional groups. An example is a silsesquioxane polymer which may be a three-dimensional molecule with a regular or irregular cage-like structure.

Material B may be an aliphatic or an aromatic compound that includes an alkenyl end group and a carbonate end group. An aliphatic compound refers to a linear organic compound. An aromatic compound refers to a cyclic organic compound. The alkenyl end group may include a vinyl, allyl, butenyl, pentenyl, or an hexenyl end group.

Figure 2:
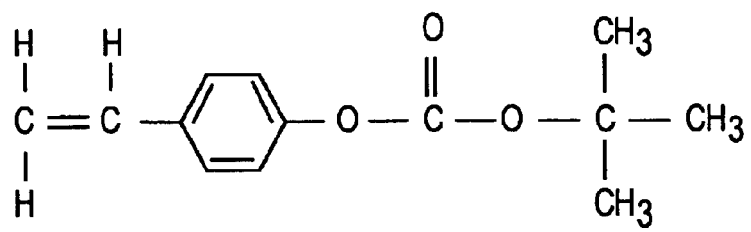
FIG. 2 is an illustration of a styrene substituted with tertiary-butyl carbonate end group according to the present invention.

In an embodiment of the present invention, material B includes an alkenyl end group and an alkyl carbonate end group. In another embodiment of the present invention, material B includes an alkenyl end group and an aromatic carbonate end group. In still another embodiment of the present invention, as shown in FIG. 2, material B may be a styrene substituted with a tertiary-butyl carbonate end group, $(CH_3)_3COCOO(C_6H_4)CHCH_2$.

In an embodiment of the present invention, a hydride functional group, that is terminal and/or pendant, from material A is added to an alkenyl, such as a vinyl, end group of material B in the presence of a catalyst. A catalyst is a substance that alters the rate of a chemical reaction without itself undergoing a permanent change in composition.

In an embodiment of the present invention, about 100 parts per million (ppm) or less of the catalyst is used. In an embodiment of the present invention, the catalyst may include a metal, such as Platinum or Rhodium. In another embodiment of the present invention, the catalyst may include a metal complex, such as Platinum carbonyl cyclovinylmethylsiloxane complex, Platinum divinyltetramethyldisiloxane complex, Platinum octanaldehyde/octanol complex, and tris(dibutylsulfide) Rhodium complex.

Figure 3:
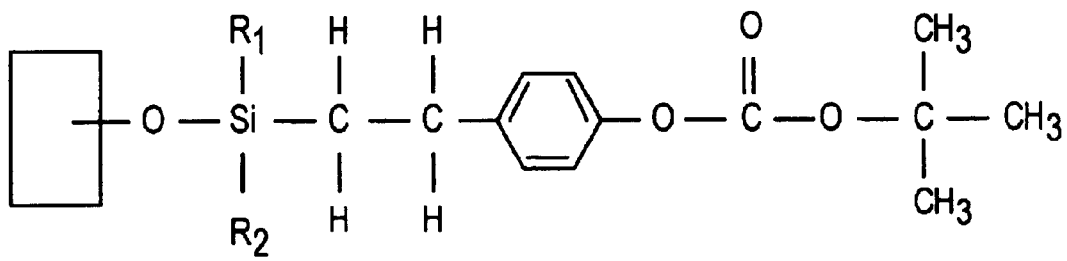
FIG. 3 is an illustration of a polyorganosiloxane with tertiary-butyl carbonate end group according to the present invention.

The reaction between material A and material B will produce material C. In an embodiment of the present invention, material C is a polyorganosiloxane, or silicone, having a linear or branched or cyclic backbone, with tertiary-butyl carbonate functional groups that may be terminal, as shown in an embodiment of the present invention in FIG. 3, and/or pendant (not shown). In another embodiment of the present invention, material C may be polyfunctional with two or more tertiary-butyl carbonate functional groups per molecule.

Figure 4:
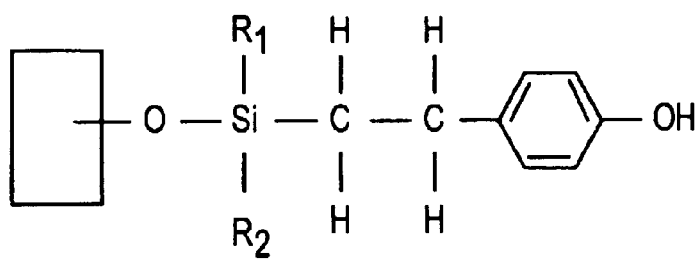
FIG. 4 is an illustration of a polyorganosiloxane with phenol end group according to the present invention.

Material C is then heated to a temperature, such as about 100–150 degrees Centigrade, to release tertiary-butyl carbonate functional groups and form material D. The temperature may be higher when material B is an aliphatic compound and lower when material B is an aromatic compound. In an embodiment of the present invention, material D is a polyorganosiloxane, or silicone, having a linear or branched or cyclic backbone, with phenol functional groups that may be terminal, as shown in FIG. 4, and/or pendant (not shown). In another embodiment of the present invention, material D may be polyfunctional with two or more phenol functional groups per molecule.

Figure 5:
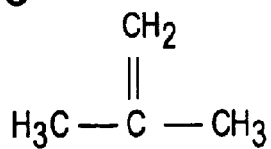
FIG. 5 is an illustration of isobutylene as gaseous byproduct according to the present invention.
Figure 6:
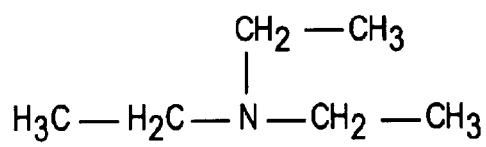
FIG. 6 is an illustration of triethylamine as acid acceptor according to the present invention.

Heating also breaks down the tertiary-butyl carbonate functional groups, whether terminal and/or pendant, to form byproducts, such as isobutylene, $(CH_3)_2CCH_2$, as shown in FIG. 5, and carbon dioxide, $CO_2$. The isobutylene and carbon dioxide may be evolved as gaseous byproducts.

Material D may also be formed in other ways. In an embodiment of the present invention, material D may be formed by reacting silazane with protected alcohol functional groups that are terminal and/or pendant and then cleaving the protecting groups to produce phenol functional groups that are terminal and/or pendant.

Material D is then reacted with material E and material F to form material G. In an embodiment of the present invention, a low temperature, such as about 0 degree Centigrade, is used since, otherwise, reactivity may be too high.

Material E may be a cyanogen halide. In a first embodiment of the present invention, cyanogen bromide (BrCN) may be used. In another embodiment of the present invention, cyanogen chloride (ClCN) may be used. In still another embodiment of the present invention, cyanogen iodide (ICN) may be used.

Material F is an acid acceptor, such as a base. In an embodiment of the present invention, material F may include a linear or branched alkyl amine, such as triethylamine, $(CH_3CH_2)_3N$. In other embodiments of the present invention, the alkyl group may include methyl, n-propyl, isopropyl, n-butyl, sec-butyl, tert-butyl, pentyl, octyl, undecyl, and octadecyl.

The reaction of material D and material E will produce material G and an acidic byproduct. The acidic byproduct will react with material F to form a halide salt. The halide salt may be removed by washing with water. Ions and halogens should be removed to prevent corrosion.

Figure 7:
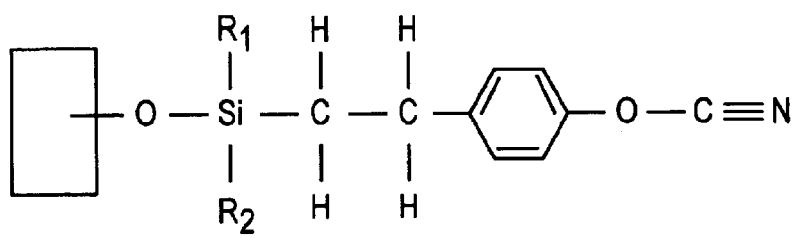
FIG. 7 is an illustration of a polyorganosiloxane with aromatic cyanate ester end group according to the present invention.

In an embodiment of the present invention, material G is a polyorganosiloxane, or silicone, having a linear or branched or cyclic backbone, with aromatic cyanate ester functional groups, that may be terminal, as shown in FIG. 7, and/or pendant. In another embodiment of the present invention, material G may be polyfunctional with two or more aromatic cyanate ester functional groups per molecule.

Material G may enhance performance and reliability of an electronic package. In an embodiment of the present invention, material G may serve as an underfill, such as for a flip chip. In another embodiment of the present invention, material G may serve as an encapsulant. In still another embodiment of the present invention, material G may serve as an adhesive, such as for die attach.

An adhesive may attach a die to a surface of a substrate. The surface of the substrate may or may not be metallized with a wiring pattern. In an embodiment of the present invention, the surface of the substrate is the floor of a cavity that is defined by one or more tiers surrounding the surface. In another embodiment of the present invention, the substrate has no cavity and the surface is an entire side of the substrate.

The die attach adhesive provides a mechanical and thermal interface between the die and the substrate. The die may be formed from a semiconductor material, such as silicon. In an embodiment of the present invention, the substrate is formed from a ceramic material to provide a stable dielectric constant, a low dielectric loss tangent, and good thermal dissipation. In another embodiment of the present invention, the substrate is formed from an organic material to provide a low dielectric constant, a lighter weight, and a low cost.

Material G may be a solvent-free paste so solvent removal is not required during curing. In an embodiment of the present invention, material G has the appropriate viscosity and surface tension to wet the surface of the substrate. In another embodiment of the present invention, material G has the appropriate viscosity and surface tension to wet the backside of the die. Good adhesion requires penetration of material G into crevices or pores at the surface of the substrate and/or at the backside of the die. As needed, contamination at the surface of the substrate and at the backside of the die may be removed, such as by Argon plasma clean, before dispensing the die attach adhesive.

A dispense pattern for the die attach adhesive may depend on the size and shape of the die and the size and shape of the substrate, such as the cavity. The dispense pattern must ensure a bond line that is free of voids. In an embodiment of the present invention, dispensing a series of dots may produce a flatter and more evenly contoured dispense than dispensing a continuous line. In another embodiment of the present invention, the outermost dots may be larger than the inner dots so as to provide a flatter dispense.

The dispense pressure and the syringe tip speed should be controlled to deliver the proper volume of the die attach adhesive. In an embodiment of the present invention, the needle of the syringe is programmed to move back over the dispensed portion of the die attach adhesive before moving up to its highest set position so as to avoid tailing.

Application of the die attach adhesive is followed by die placement. Die placement onto the dispensed die attach adhesive must be performed precisely with respect to placement accuracy, orientation, and planarity. Applying pressure to set the die onto the adhesive may help to establish good adhesion and proper bond line thickness.

Die placement is followed by curing of the die attach adhesive at an appropriate temperature for an appropriate duration of time to bond the surface of the substrate to the backside of the die. Material G may possess two or more aromatic cyanate ester functional groups that may be terminal and/or pendant per molecule.

Material G may be heated to a temperature, such as about 150 degrees Centigrade or higher, in the presence of a curing catalyst to cross-link and form material K. Curing is a process, induced by exposure to heat or light, that involves a chemical reaction and requires a catalyst. Cross-linking involves formation of covalent bonds that may be intermolecular or intramolecular.

Material G undergoes addition polymerization during the cure to form material K. No leaving groups are produced. Volatile byproducts are undesirable since they may form voids that result in a porous and weak bond line interface.

In an embodiment of the present invention, the curing catalyst may include an organometallic compound. Organometallic refers to an organic group that includes at least one carbon atom which is bonded to a transition metal atom. A transition metal is an element that includes 1–10 electrons in a "d" sublevel and is classified in a group (a column designated "B" in the United States) near the center of the Periodic Table of the Elements.

In another embodiment of the present invention, the curing catalyst may include a metal chelate and/or a metal salt. A chelate is a heterocyclic compound having a central metallic ion covalently bonded to two or more nonmetallic atoms in the same molecule. The metal may be divalent (II), trivalent (III), or tetravalent (IV). Examples of metals include Copper, Zinc, Cobalt, Manganese, Tin, Nickel, Titanium, Aluminum, and Lead. Examples of ligands include napthenates, octoates, octylates, and acetylacetonates. A ligand is a molecule, ion, or atom, that is covalently bonded to the central metal compound of a coordination compound.

The curing catalyst may be provided in a solution of material H. Material H includes an alkyl liquid phenol, such as nonylphenol. In an embodiment of the present invention, the metal concentration may be about 0.0025–0.0200 parts by weight on the basis of 100 parts by weight of polymer (resin), depending on pot life and curing requirements. In an embodiment of the present invention, about 5 percent by weight or less of the curing catalyst is used. In another embodiment of the present invention, about 1–2 percent by weight of the curing catalyst may be used.

In an embodiment of the present invention, curing of material G will result in cyclotrimerization of material G to form material K with a three-dimensional network of substituted triazine rings. Each triazine ring, $(ArOCN)_3$, is formed from an end group or pendant group of 1–3 molecules of material G. The triazine ring is a heterocyclic ring. A heterocyclic ring is a ring compound that includes carbon, as well as non-carbon atoms, such as nitrogen (in this case), oxygen, and sulfur.

Figure 8:
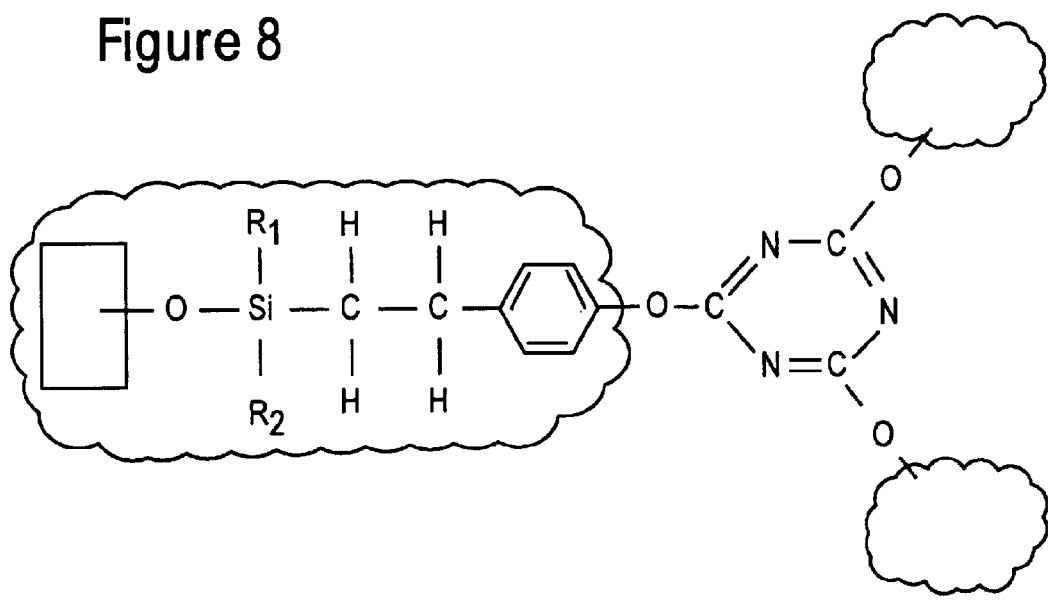
FIG. 8 is an illustration of substituted triazine rings according to the present invention.

Material K, as shown in FIG. 8, with the three-dimensional network, bonds the surface of the substrate to the backside of the die. Adhesive strength may be determined by measuring peeling strength at a boundary between the die and the substrate. Material K may have an adhesive strength of about 1–10 MPa.

In an embodiment of the present invention, other (non-G) materials may be present when material G is cured to form material K. The non-G materials may include cross-linking agents, extending agents, and hardening agents. The non-G materials may be monofunctional, bifunctional, or polyfunctional. Monofunctional monomers react to form low-molecular-weight products. Bifunctional monomers react to form linear polymers. Polyfunctional monomers react to form branched or cross-linked (three-dimensional) polymers.

The non-G materials may include cyanate ester functional groups or other types of functional groups, such as hydroxyl (OH), amine (NH), cyanate (CNO), and epoxy. In an embodiment of the present invention, the functional groups on the non-G materials may react and co-cure with the aromatic cyanate ester pendant and/or end groups of material G.

In another embodiment of the present invention, functional groups on the die or substrate (mold compound) may react and co-cure with the aromatic cyanate ester pendant and/or end group of material G to improve adhesion to the die or substrate. In an embodiment of the present invention, the aromatic cyanate ester pendant and/or end group of material G may condense with a hydroxyl (OH) functional group on the die or the substrate (mold compound) to form an imidocarbonate linkage. In an embodiment of the present invention, the imidocarbonate linkage may be thermally reversible.

In yet another embodiment of the present invention, ambient moisture or water, $H_2O$, may react with the aromatic cyanate ester pendant and/or end group of material G, $NCOArR1(OSiR2R3)_nR1ArOCN$, to form aromatic carbamate pendant and/or end group of material G2, $H_2NCOOArR1(OSiR2R3)_nR1ArOOCNH_2$. When heated, the aromatic carbamate pendant and/or end group of material G2 will breakdown, or decompose, to form aromatic amine pendant and/or end group of material G3, $H_2NArR1(OSiR2R3)_nR1ArNH_2$, and carbon dioxide, $CO_2$, gaseous byproduct.

In an embodiment of the present invention, the cure of material G is optimized to react most of the aromatic cyanate ester pendant and/or end groups. Thus, production of carbon dioxide in the interior of the package cavity, when moisture and heat are present, may be minimized.

In another embodiment of the present invention, instead of co-curing with material G, the non-G materials may cure independently to form an interpenetrating polymeric network (IPN) within the three-dimensional network of material K.

In an embodiment of the present invention, material K, as shown in FIG. 8, has a novel composition that includes siloxane backbones that are linked to triazine rings. The three-dimensional network of substituted triazine rings makes material K thermally stable. Thus, material K is compatible with a 260-degree Centigrade reflow that may be part of a subsequent Lead-free solder process. Material K is also easily collapsible so a very thin bond line thickness (BLT) may be achieved in die attach.

The material properties and mechanical properties of material K depend on the average distance between the triazine rings (cross-link density) in material K, which, in turn, is affected by the distance between the pendant and/or end groups on the backbone and the branches, if present, in material A. Chain entanglement of material K depends on polarity and shape of the polymer and may occur if a critical chain length or molecular weight is exceeded. In an embodiment of the present invention, a higher cross-link density will result in a a higher glass transition temperature, $T_g$, a lower coefficient of thermal expansion (CTE), a higher Young's modulus of elasticity, and a lower moisture absorption.

The glass transition temperature, $T_g$, refers to the temperature at which a non-crystallizable or amorphous polymer changes properties as it transitions between a glassy state (below the $T_g$) and a rubbery state (above the $T_g$). A polymer in the glassy state tends to be hard, stiff, brittle, and transparent while a polymer in the rubbery state tends to be soft, flexible, tough, and opaque.

The $T_g$ of a homopolymer largely depends on the stiffness or flexibility of the repeating unit in the backbone (or main chain) of the polymer and the functional (side) groups attached to the backbone. The stiffness or flexibility depends on the ease of rotation about the bonds in the backbone and the side groups, as well as the size, bulkiness, and polarity of the side groups. The $T_g$ also depends on molecular weight, branching, and crosslinking of the polymer.

Block and graft copolymers usually have multiple $T_g$ that are near the $T_g$ for each constituent homopolymer. In contrast, alternating and random (or statistical) copolymers usually have a single $T_g$ between the $T_g$ of the constituent homopolymers.

The CTE refers to the fractional change in dimension per unit change in temperature. Typically, the CTE of a material will increase significantly when the temperature is above the glass transition temperature, $T_g$.

Young's modulus of elasticity, also known just as modulus of elasticity, refers to a ratio of stress to strain of a material that is placed in tension, compression, or shear. Stress refers to a rate of applied load to a cross-sectional area. Strain refers to a rate of change in length, or elongation, relative to an original length.

A good stress buffer located at the interface between two dissimilar materials will prevent warpage, bending, cracking, or delamination even though a large amount of stress, such as tensile stress, is induced by thermal cycling. In an embodiment of the present invention, the mechanical properties of material K may be optimized to prevent damage to the materials on either side of the interface.

A low value of the modulus of elasticity will allow material K to serve as a good stress buffer between a silicon die and a substrate. A silicon die has a relatively low CTE of about 2–3 ppm/degree Centigrade. However, a ceramic (alumina) substrate has a CTE of about 6–9 ppm/degree Centigrade, a plastic substrate has a CTE of about 20 ppm/degree Centigrade, and an organic substrate may have a CTE of about 30 ppm/degree Centigrade or greater.

The modulus of elasticity is related to the amount of stress that the die attach adhesive will transfer to the silicon die when a mismatch in CTE exists between the die and the substrate. A die attach adhesive with a high modulus of elasticity will hold the die rigidly and transfer more stress to the die.

The mechanical properties of material K may be optimized to maintain a desired modulus of elasticity at a certain temperature above the glass transition temperature, $T_g$. The glass transition temperature may be about −25 to 100 degrees Centigrade. The modulus of elasticity may be about 100 MPa to 2 GigaPascals (GPa).

Material I is a filler that may be included, as needed, during the curing of material G to form material K. A filler is a substance that may be blended with a polymer to improve material and mechanical properties, such as thermal conductivity and electrical conductivity. In an embodiment of the present invention, a filler loading of about 50 percent by weight or less is used. In another embodiment of the present invention, a filler loading of about 20–40 percent by weight may be used.

Material K may have a high CTE, such as about 50–200 ppm/degree Centigrade, depending upon the cross-link density. The CTE is usually lower for an aromatic compound and higher for an aliphatic compound. In an embodiment of the present invention, material I may have a low CTE, such as about 2–3 ppm/degree Centigrade, so material I may be blended with material G to reduce the CTE of material K. For comparison, a metallic solder bump may have a CTE of about 20–30 ppm/degree Centigrade.

In another embodiment of the present invention, material I may be blended with material G to increase fracture toughness of material K, such as to about 2 MPa/m². Fracture toughness of a material is related to the amount of energy that is required to propagate a crack in the material.

In still another embodiment of the present invention, material I may be blended with material G to improve workability or processability. In an embodiment of the present invention, material I may be a diluent. A diluent is a low-molecular-weight material that may serve a function similar to that of a solvent. In an embodiment of the present invention, curing may result in linking of a diluent, such as material I, with a higher-molecular-weight material, such as material G, to reduce viscosity. Any residual diluent that remains unlinked may subsequently vaporize or outgas and may contaminate the interior of the package cavity.

Examples of diluents may include liquid epoxies and liquid cyanate esters. Examples of liquid epoxies include Epon resin 234, Epon resin 235, Epon resin 813, Epon resin 815C, Epon resin 862, Epon resin 8021, Epon resin 8101, Epon resin 8111, and Eponex resin 1510.

Material I may include particles of a material, such as silica ($SiO_2$). In an embodiment of the present invention, a silica loading of about 50 percent by weight or less is used. In another embodiment of the present invention, a silica loading of about 20–40 percent by weight of silica may be used.

In an embodiment of the present invention, the silica particles may have a nominal diameter of about 0.5–5.0 microns (um). In another embodiment of the present invention, the silica particles may have a nominal diameter of about 5.0–10.0 um. In still another embodiment of the present invention, the silica particles may have a nominal diameter of about 10.0–25.0 um.

Bleed out is a separation of a monomer vehicle phase and the filler during staging or cure that results in a spread of the resin away from a deposit location, such as the die bond area. Resin flow may contaminate, or otherwise interfere, with the wire bond pads. Bleed out may be strongly affected by temperature. In an embodiment of the present invention, the curing reaction, such as for cyanate ester, may be exothermic. The resultant elevation in temperature may reduce viscosity of the monomer, thus increasing bleed out.

Fumed silica may be used as a thixotrope to increase viscosity of material G. A higher viscosity may reduce or inhibit bleed out of material G. Fumed silica is finely divided silica that may be formed by reaction of silicon tetrachloride ($SiCl_4$) and hydrogen ($H_2$).

The thixotropy of a liquid refers to the flowability of the liquid. A thixotropic liquid has a great surface tension and may form a convex surface. A higher thixotropic index at room temperature will allow a material to shear thin. Silica may be blended with material K to reduce BLT to about 0.5–4.0 mil.

Silica may also be blended with material G to reduce dielectric constant of material K. In an embodiment of the present invention, the dielectric constant may be about 2.0–3.0.

Polydimethylsiloxane polymers may include highly ionic, cohesive main chains (backbones) and nonionic, less cohesive side chains. In general, the polydimethylsiloxanes may have a helical structure, with the siloxane bonds directed inward. Introducing siloxane structures into a polymer increases the space occupied by the polymer. Siloxane structures also provide elasticity and flexibility to a polymer because they tend not to interact with each other.

In an embodiment of the present invention, the silicone backbone of material K has a sufficiently low modulus of elasticity. However, in another embodiment of the present invention, material I may be blended with material G to increase flexibility of material K. Material I may include elastomers, such as polytetrafluoroethylene (Teflon), cross-linked olefins, and acrylates.

Material J is a coupling agent that may be included, as needed, during the curing of material G to form material K. In an embodiment of the present invention, about 2 percent by weight or less of the coupling agent is used. In another embodiment of the present invention, about 1 percent by weight or less of the coupling agent is used.

A coupling agent, such as material J, improves an interfacial bond between a polymer (continuous phase), such as material G, and a filler (discontinuous phase), such as material I. In an embodiment of the present invention, material J may modify a surface of material I to lower surface tension, enhance wetting, and improve adhesion.

In an embodiment of the present invention, a coupling agent, such as material J, includes a first functional group that reacts with the polymer, such as material G, and a second functional group that reacts with the surface of the filler. Examples of coupling agents include organosilanes, organotitanates, organozirconates, aluminates, silicate esters, metal acrylates, and methacrylates. Other examples of coupling agents include compounds that contain a copolymerizable group and a chelating ligand, such as phosphine, mercaptan, and acetoacetate.

Die attach may be followed by wire bonding and encapsulation. Wire bond pads are located on the tier(s) or co-planar with the surface of the substrate. A wire-bonding machine welds fine wires, typically of Aluminum or Gold, between each die bond pad on the die and the appropriate wire bond pad on the substrate. Wire bonding may also provide interconnections for die-to-die as well as for die-to-passive component, such as capacitor, resistor, or inductor.

Finally, encapsulation protects the die and the bond wires from mechanical damage during subsequent handling and processing. Encapsulation may involve liquid dispensing or transfer molding.

Many embodiments and numerous details have been set forth above in order to provide a thorough understanding of the present invention. One skilled in the art will appreciate that many of the features in one embodiment are equally applicable to other embodiments. One skilled in the art will also appreciate the ability to make various equivalent substitutions for those specific materials, processes, dimensions, concentrations, etc. described herein. It is to be understood that the detailed description of the present invention should be taken as illustrative and not limiting, wherein the scope of the present invention should be determined by the claims that follow.

Thus, we have described a die attach adhesive and a method of forming such an adhesive.

I claim:

1. A method comprising:
    providing a material A, said material A comprising a siloxane backbone with a hydride functional group;
    reacting said material A with a material B in the presence of a catalyst to form a material C, said material B comprising an alkenyl functional group and an aromatic carbonate functional group;
    heating said material C to form a material D, said material D comprising a phenol functional group; and
    reacting said material D with a material E and a material F to form a material G, said material E comprising a cyanogen halide, said material F comprising an acid acceptor, said material G comprising an aromatic cyanate ester functional group.

2. The method of claim 1 wherein said material A comprises a linear siloxane backbone.

3. The method of claim 1 wherein said material A comprises a branched siloxane backbone.

4. The method of claim 1 wherein said material A comprises a cyclic siloxane backbone.

5. The method of claim 1 wherein said material B comprises a styrene substituted with a tertiary-butyl carbonate functional group.

6. The method of claim 1 wherein said catalyst comprises a complex of a metal.

7. The method of claim 1 wherein said material E comprises cyanogen bromide (BrCN).

8. The method of claim 1 wherein said material F comprises an alkyl amine.

9. A method comprising:
    providing a material G, said material G comprising a polyorganosiloxane that includes aromatic cyanate ester functional groups; and
    heating said material G in the presence of a catalyst to form a material K.

10. The method of claim 9 wherein said catalyst comprises an organometallic compound.

11. The method of claim 9 wherein said catalyst comprises a metal chelate.

12. The method of claim 9 wherein said catalyst is provided in a solution of alkyl liquid phenol.

13. The method of claim 9 wherein said material K comprises siloxane backbones that are linked to triazine rings.

* * * * *